Dec. 4, 1962 W. J. POPPELBAUM 3,067,339
FLOW GATING
Filed Jan. 15, 1959 2 Sheets-Sheet 1

INVENTOR.
Wolfgang J. Poppelbaum
BY
*Roland A. Anderson*
ATTORNEY

United States Patent Office 3,067,339
Patented Dec. 4, 1962

3,067,339
FLOW GATING
Wolfgang J. Poppelbaum, Champaign, Ill., assignor to the United States of America as represented by the United States Atomic Energy Commission
Filed Jan. 15, 1959, Ser. No. 787,094
2 Claims. (Cl. 307—88.5)

The present invention relates to transfer of information between bistable circuits used for storage of information, and more specifically to novel circuits especially suited for transferring information representing binary 1 or 0 from one place to another in a computing machine.

D.C.-bistable elements are commonly used in computing machines to store information. When in a first bistable state, the device represents 0, while in the second state it represents 1, in conventional terminology. A common bistable element is the symmetric Eccles-Jordan flipflop, which may be set to a given state by applying an appropriate trigger pulse to the appropriate one of its two inputs. The state may be monitored by the voltage appearing at the two output terminals. The respective inputs and outputs are in phase; that is, a positive signal at one input will cause a positive output at the corresponding output.

Information may be transferred from one flipflop to another in several ways. A commonly used method is clearing and gating, wherein (1) the receiving flipflop is set to 0, (2) the information is gated from the sending flipflop through an intermediate gate circuit into the receiving flipflop. A faster method of transferring information is that of double gating, which requires sensing the state of the sending flipflop and gating into one input or the other of the receiving flipflop accordingly. While double gating is faster because it requires only one operation, it obviously requires two gates, rather than one, connected to each receiving flipflop.

Another common storage element is the asymmetric flipflop such as the Schmitt trigger circuit, which has one input connected to a source of bias potential and the other input free to receive information. The single free input terminal must be raised to gate in a 1, lowered to gate in a 0, or disconnected from the incoming signal to remain in the state to which last set. Obviously such circuits cannot be gated with a single diode, which has an unidirectional impedance. Such circuits also require a second input which is the complement of the gating signal for double gating. The production of such a signal within a computer is cumbersome and requires extra components.

With a knowledge of the difficulties arising in the prior art from transferring of information between bistable circuits, it is the primary object of this invention to provide a rapid, simple system for such transfer.

Another object of this invention is to provide a fast gating system which requires no special clearing signal in addition to the gating system.

Still another object of this invention is to provide a gating system which is capable of performing simultaneously the two separate steps of clearing and gating heretofore known to the prior art.

These and other objects and advantages of this invention will become apparent from the following detailed description thereof, when read in conjunction with the attached drawings, wherein.

In accordance with this invention, each D.C.-bistable circuit which is to receive information has its elements energized from voltage supplies which may be simultaneously gated; that is, temporarily lowered simultaneously by a constant factor $k$. In the simplest case, a single supply is provided for all elements. Unilateral impedance means such as transfer diodes are connected between the output of each circuit which is to send information and the input of each receiving circuit. The potentials at the outputs and inputs of the bistable circuits are such that the transfer diodes are conditionally conducting, depending on the state of the sending flipflop, only when the voltage supply of the receiving circuit is lowered. In the normal condition, with the voltage supplies at normal levels, the transfer diodes are cut off so that one flipflop is effectively isolated from the other.

Figure 1:
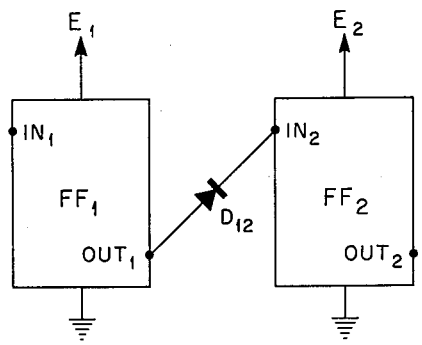
FIG. 1 represents schematically the flow-gating principle.

Referring now to FIG. 1, the flow-gating principle is applied to bistable circuits of a general class having two trigger inputs and an output in phase with one input. Flipflops 1 and 2 are shown interconnected merely by a single diode $D_{12}$. Potentials to energize all the elements of the flipflops are provided by respective sources of voltage $E_1$ and $E_2$. An input and an output are chosen for each flipflop which are in phase but which have a different average potential for the two circuit states, the input potentials being higher than both output potentials. Since either of the two possible output voltages at $out_1$ is lower than the voltage at the input $in_2$, the connecting transfer diode $D_{12}$ cannot conduct and the two flipflops are effectively isolated. To transfer information into flipflop 2, the voltage source $E_2$ of the receiving flipflop 2 is gated (lowered) to a new temporary value $E_2'$, such that the arithmetic mean of the two possible potentials of the output of flipflop 1 is equal to the trigger potential of the input of flipflop 2 when the potentials are reduced to the magnitude $E_2'$. The state of flipflop 2 cannot change, since all elements are energized from the same source merely by lowering the voltage to $E_2'$. But when the voltage is lowered, current can flow through the transfer diode if the output $out_1$ is at its higher potential, providing the trigger to set the receiving flipflop 2 to the corresponding state (input and output at higher potential condition).

The above operation will be further illustrated by reference to a specific circuit diagram. While the circuit illustrated utilizes pnp transistors, it is to be understood that this invention applies equally to known bistable circuits using other transistors or electron tubes, in symmetric or asymmetric circuits. The asymmetric bistable flipflop shown includes transistors 10, 11, each provided with base, collector, and emitter electrodes. The trigger points are the bases of the two transistors, while the output 14 is taken from the collector of transistor 11. The output is in phase with the input at terminal 13. The input to the base of transistor 11 is connected to a bias source of −15 volts through diode 18. The supply voltage is normally −20 volts, but is dropped to −45 volts for substantially 50 millimicroseconds to gate in information. The circuit values are chosen for selected transistors of the type GF-45011 having a transistor alpha between .98 and 1.00.

Transistors 10, 11 have their emitters returned to ground through a common resistor 9 and their collectors supplied from a common supply through resistors 8, 19. The collector of transistor 10 is coupled to the base of transistor 11 through a voltage divider including resistors 6, 7. The potential at the base of transistor 10 is normally established by a voltage divider including resistors 16, 17. The base of transistor 10 is coupled to input 13 through diode 12. The output 14 is caught at −10 volts by diode clamp 15, to prevent the collector voltage from rising above −10 volts when transistor 11 conducts, and operates at the supply voltage (about −20 volts) when transistor 11 is quiescent.

Operation of the circuit is as follows. The voltage output from a connected sending flipflop at input 13 may be −10 or −20 volts. When the circuit is energized, transistor 11 will conduct substantially all the current in preference to transistor 10 because the latter's base potential is held at substantially −8 volts by the voltage divider 17, 16 connected across the power supply, while the former's base potential is very nearly −9 volts because of voltage divider 6, 7, 8 as long as transistor 10 is cut off. As transistor 11 conducts, the drop across collector resistor 19 will cause the potential at output 14 to rise, providing a "high" or "1" output potential. When the supply voltage is gated (lowered) to −45 volts, voltage divider 16—17 will pull the base potential of transistor 10 down to about −17 volts and divider 6, 7, 8 will pull the base potential of transistor 11 down to −15 volts, where it is caught by diode clamp 18. If the input voltage is −20 volts, then transistor 10, having the lower base potential, will conduct in preference to transistor 11, which will be cut off. The in-phase output 14 will be low (−20 volts). If, however, the input is driven to a potential above the −15 volts bias, such as −10 volts, diode 12 will conduct, raising the base potential of transistor 10 to −10 volts, so that transistor 11, having the lower base potential, will conduct, transistor 10 will be cut off, and output 14 will be high (−10 volts). Return of the supply voltage to its normal value will not change circuit conditions so that the output will remain at the high or low level to which it was set by the input signal (−10 or −20 volts) during the gating interval. It should be noted that only one operation is required, as in double gating, but the extra circuit complexities of double gating are eliminated.

Figure 2:
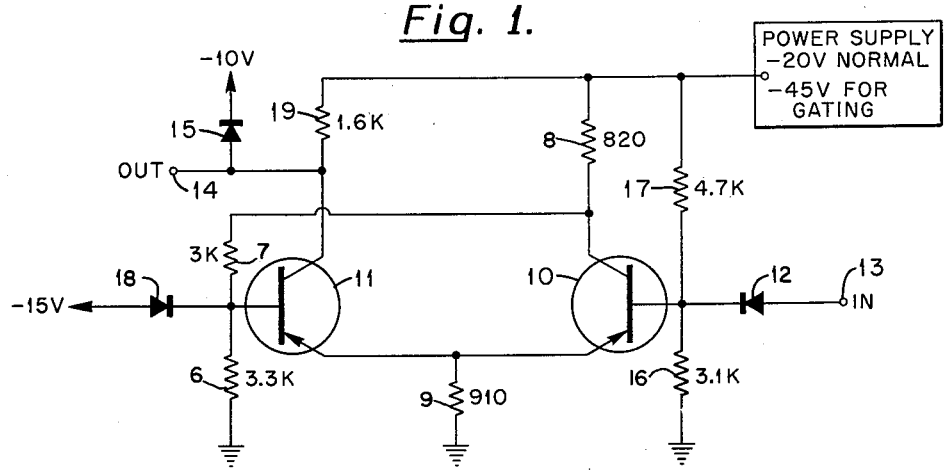
FIG. 2 is a circuit diagram of a flow-gating flipflop.
Figure 3:
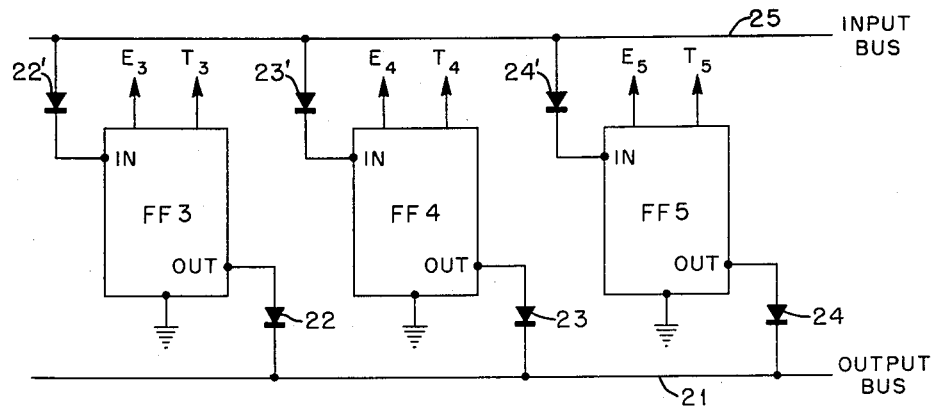
FIG. 3 illustrates a flow gating register.

Referring now to FIG. 3, a group of bistable circuits is shown arranged to form a register to illustrate how flow gating is utilized in bistable circuits in connection with collector gating of the sending circuit. The outputs of any number of flow gating flipflops FF3, FF4, FF5, etc. may be tied through diodes 22, 23, 24, etc. to a common output bus 21, which will then carry the information of any one of the flipflops which has its output in the "sending range." A "sending range" may be established in a flipflop by returning resistor 19 (FIG. 2) to a separate gated negative supply T which is normally sufficiently negative to prevent the transfer diode between its output and any associated flipflops from conducting. This extra blocking voltage supply is indicated as $T_3$, $T_4$, $T_5$. The collector-supply voltage of one transistor (11 in FIG. 2) is therefore used to provide a "gate-out" signal for any one of the flipflops. The voltage supply $T_i$ is gated (raised) so that it no longer blocks current flow through the associated transfer diode, selecting the $i$th flipflop to transmit an output along the output bus to a receiving flipflop in another part of the machine. The input terminals corresponding to input 13 in FIG. 2 are all connected to a common input bus 25 through diodes 22′, 23′, 24′, etc. Only that flipflop whose supply voltage is lowered, as with the −20 to −45 volt gating pulse described above, is selected to receive the information from the input bus and be set accordingly. Thus it is apparent that by merely gating $T_i$, then $E_k$, information may be transferred readily and easily between any two flipflops $i$, $k$, connected to the common input bus and common output bus.

It will be apparent that the input and output buses need not be physically separate. The inputs and outputs of any number of flipflops may be tied to single common bus through respective transfer diodes. Then to transfer information from any flipflop $i$ to any other flipflop $k$, the supply voltages T are all maintained sufficiently low so that no flipflop is in the sending range. Then $T_i$ voltage is raised and $E_k$ is lowered. Then current may flow through the transfer diode from flipflop $i$ and set the receiving flipflop $k$ in the manner described above.

Figure 4:
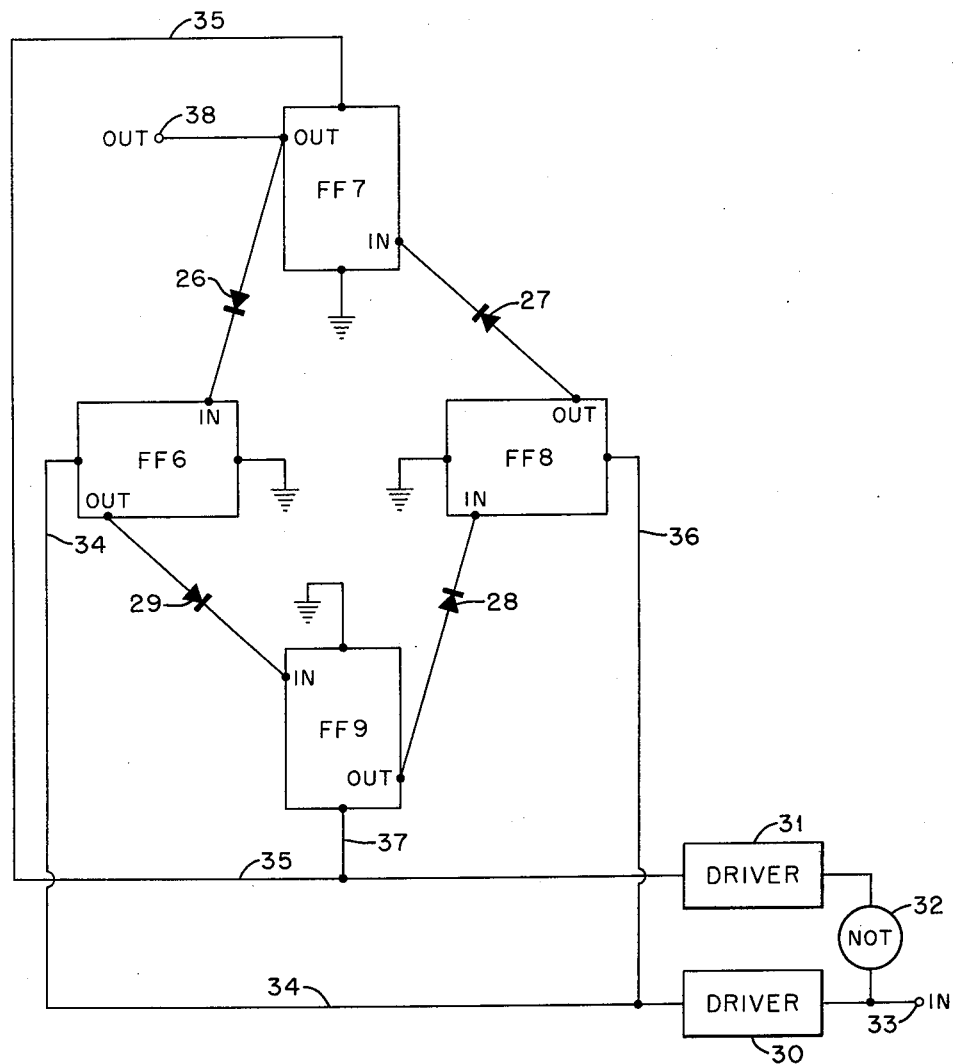
FIG. 4 illustrates a flow gating binary counter stage.

Referring now to FIG. 4, a binary counter stage is shown which corresponds to a "true-toggle-false-toggle" counter which normally requires four gating AND's and two decoding AND's. Flipflops 6, 7, 8 and 9 are connected in a ring by transfer diodes 26–29. Signal voltages applied to the input 33 are fed to a conventional driver 30 and also are applied through a "not" or inverter circuit 32 to driver 31. The drivers are used to furnish the supply and gating voltages E for the four flipflops through leads 34–37 respectively. Assume a square wave input alternating above and below a reference level at point 33, and normal voltage levels E on all flipflops so that no diode conducts. When the input at 33 is a 1 or positive signal, the gating voltages applied to flipflops 6 and 8 through leads 34, 36 will be at their highest value, and these flipflops cannot receive information. Because of the "not" circuit 32, the driver 31 will furnish the inverse (low) voltages to flipflops 7 and 9 so that these circuits will be able to receive information. Therefore information may flow from flipflop 6 through diode 29 into flipflop 9, and from flipflop 8 through diode 27 into flipflop 7. When the input voltage now goes back to a 0 or negative signal, the gating voltages supplied to the flipflop are reversed, and the content of flipflops 7 and 9 may be transmitted to flipflops 6 and 8 respectively. An output may be taken at 38 for an incoming symmetrical square wave, the output will be square pulses, the period of which is twice that of the incoming wave. If alternate non-overlapping gating signals are provided by the two drivers, the counter is asynchronous.

A typical counter stage as above has a complexity $C=16$, where the complexity is defined as the number of transistors plus ½ the number of diodes. A conventional counter of this sort has a complexity of 25–31. It is apparent that a considerable saving in number of components is achieved with the flow gating counter.

The flow gating principle may also be applied to double gating of Eccles-Jordan trigger circuits by providing an additional output emitter follower having its collector tied through an appropriate low resistor to a variable supply voltage. This supply voltage is raised to select the sending flipflop. The receiving flipflop has the voltage supply of the cross-coupled inverters lowered until the bases of the inverters come into the receiving region where the two transfer diodes going into these bases can conduct, if so energized by the sending flipflop.

It will be apparent to those skilled in the art that with circuit interconnections as described above information may be transferred rapidly between bistable storage elements with a reduction in both circuit complexity and number of components. The foregoing examples should be construed as illustrative only and not in limitation of the scope of this invention, which scope is limited only by the appended claims.

Having described the invention, what is claimed as novel is:

1. An asymmetric bistable circuit capable of assuming first or second stable states upon receiving first or second input voltages comprising a source of negative supply potential having a normal magnitude more negative than said input voltages and a still more negative temporary magnitude, first and second voltage divider networks connected between said source and ground, first and second transistors each including a base, an emitter, and a collector electrode, a first resistor connecting both said emitters to ground, respective load resistors connecting each said collector to said source of potential, means connecting said bases to respective voltage divider networks, a source of bias voltage intermediate said input voltages, first unilateral impedance means connected between said bias source and the base of said second transistor and poled to conduct current into said base, an input terminal, second unilateral impedance means connected between said terminal and the base of said first transistor and poled to conduct current into said base, and an output terminal connected to the collector of said second transistor to provide an output in phase with said input, the magnitudes of said divider networks being such that lowering said supply source to its temporary value lowers the voltage at the base of said first transistor below the voltage of said input, allowing current to flow across said second unilateral impedance to establish a control voltage at said last named base.

2. A flow gating circuit comprising sending and receiving bistable circuits, each of said bistable circuits being provided with an input and an output terminal and two current switching devices, each of said circuits being adapted to receive at its input binary input signals from an external source, to switch current through one or the other of said devices, and to produce at its output a higher or lower potential corresponding to current flow through said one or the other of said devices and in phase with said input signals; a separate power supply for each of said bistable circuits to provide in sequence first and second energizing potentials; unilateral impedance means connected between a sending circuit output and a receiving circuit input and poled to conduct current into said receiving circuit, respective voltage dividers in each of said bistable circuits to connect one of said power supplies to its respective input terminal, said first and second energizing potentials being such that the potential at the corresponding input terminal when said first potential is connected thereto will be higher than either of said output potentials, but the potential at the corresponding input terminal, when said second potential is connected thereto, will be lower than either of said output potentials.

References Cited in the file of this patent
UNITED STATES PATENTS

| | | |
|---|---|---|
| 2,785,304 | Bruce et al. | Mar. 12, 1957 |
| 2,798,983 | Warman | July 9, 1957 |
| 2,816,226 | Forrest et al. | Dec. 10, 1957 |
| 2,838,664 | Wolfendale | June 10, 1958 |
| 2,867,734 | Steed | Jan. 6, 1959 |
| 2,931,922 | Tubinis | Apr. 5, 1960 |